United States Patent [19]
Mizutani et al.

[11] Patent Number: 5,352,362
[45] Date of Patent: Oct. 4, 1994

[54] BRINE RECYCLING METHOD AND APPARATUS THEREFOR

[75] Inventors: Masumi Mizutani; Kaoru Mizutani, both of Gifu; Masaru Kawahashi, Toyonaka; Yoshio Fujiwara, Ikoma, all of Japan

[73] Assignees: Showa Water Industries Co., Ltd, Gifu; Kuraray Co., Ltd., Kurashiki; Tokiwa Co., Ltd., Osaka, all of Japan

[21] Appl. No.: 26,732

[22] Filed: Mar. 5, 1993

[30] Foreign Application Priority Data

Mar. 9, 1992 [JP] Japan ................... 4-086397

[51] Int. Cl.$^5$ ........................................ B01D 61/00
[52] U.S. Cl. ..................... 210/650; 210/639; 210/651; 210/681
[58] Field of Search ............ 210/650, 663, 651, 688, 210/195.2, 257.2, 681, 639, 500.23

[56] References Cited

U.S. PATENT DOCUMENTS

| | | | |
|---|---|---|---|
| 3,663,403 | 5/1972 | Chistenson et al. | 210/257.2 |
| 4,437,994 | 3/1984 | Baker | 210/651 |
| 4,812,240 | 3/1989 | Watts . | |
| 4,946,595 | 8/1990 | Miller, Jr. . | |
| 5,091,081 | 2/1992 | Hilgren . | |
| 5,112,489 | 5/1992 | Hartmann | 210/257.2 |
| 5,167,826 | 12/1992 | Eaton | 210/195.2 |

FOREIGN PATENT DOCUMENTS

| | | |
|---|---|---|
| 0052862 | 6/1982 | European Pat. Off. . |
| 0459868 | 12/1991 | European Pat. Off. . |
| 0073174 | 6/1977 | Japan ................ 210/650 |
| 3-43617 | 2/2591 | Japan . |
| WO88/01895 | 3/1988 | PCT Int'l Appl. . |
| 1571847 | 7/1980 | United Kingdom . |

Primary Examiner—Robert A. Dawson
Assistant Examiner—Ana M. Fortuna
Attorney, Agent, or Firm—Oblon, Spivak, McClelland, Maier & Neustadt

[57] ABSTRACT

A brine recycling method where the used brine containing metal ions is added with a reaction agent to provide a agent-added brine. The reaction agent is of a kind which, when it is reacted with the metal ions, produces an insoluble substance, excluding an oxidant which, when reacted with oxygen, produces metal oxide. The agent-added brine is subsequently filtrated with the use of a microporous filtration membrane having an average pore size within the range of 0.005 to 1 μm. A brine recycling apparatus is also disclosed which includes a filter module containing a microporous filtration membrane having an average pore size within the range of 0.005 to 1 μm. The used brine is, after having been added with the reaction agent, supplied through a supply passage into the filter module. The filtrate is then removed from the filter module through a recovery passage.

4 Claims, 3 Drawing Sheets

BRINE RECYCLING METHOD AND APPARATUS THEREFOR

BACKGROUND OF THE INVENTION

1. Field of the Invention

The present invention relates to a method of and an apparatus for recycling a used brine.

Brine is known as a solution or liquid of a low freezing point used as a low temperature medium and includes organic and inorganic brine. The brine is generally used as a coolant, an anti-freezing liquid or a heat transfer medium in either stock form or water-diluted form.

2. Description of the Prior Art

It is well known that the brine is largely used as a heat transfer medium in various applications such as, for example, an automobile engine cooling system, an ice arena or skating rink, an air-conditioning system, and a foodstuff refrigerating system. The organic brine used as an anti-freezing liquid or a coolant is prepared by mixing a base component, such as glycol or alcohol with one or more additives, for example, a corrosion inhibitor, an antioxidant, a defoaming agent, a coloring agent and so on.

In view of the presence of the additives, the brine exhibits satisfactory a corrosion inhibiting function and/or any other function dependent on the type of the additives used at an early stage subsequent to the initial use thereof. However, with passage of time, the additive such as one or more of a corrosion inhibitor, an antioxidant, a defoaming agent and others mixed in the brine depletes and deteriorates and the brine containing such additive eventually loses effective functions that ought to be exhibited by the type of the additives used.

Consequent upon degradation of the additives contained in the brine, metals comprising or located within the system in which the brine is used for an intended purpose begin to corrode and various degradation products such as metal ions and/or corrosion byproducts come to accumulate in the brine. The effective term of use of the brine that has accumulated a substantial quantity of the degradation products is generally considered to have run out and the brine is therefore replaced with a fresh brine solution. Although the effective term of use of the brine varies depending on the particular application and/or the frequency of use in the system, the effective term of use is generally considered to be 2 to 3 years.

In any event, when the used brine in the system is replaced with a substantially equal quantity of fresh brine, the used brine is recovered from the system. The used brine having been recovered from the system for the replacement with the fresh brine must be treated or otherwise disposed by a specialized waste disposal industry and, therefore, the user of the brine is burdened economically. Drainage of even a small quantity of the used brine into a drainage ditch or a river poses a critical problem leading to environmental disruption.

In view of the above, the used brine, i.e., the brine having accumulated a substantial quantity of the degradation products, can be recycled and, for this purpose, various recycling methods have hitherto been suggested and practiced. One of them is a so-called distillation method in which a distillation process is employed to recover the base component, that is, glycol or alcohol, of the used brine, and another one of them is a filtration method in which a filtering membrane having a multiplicity of micropores of 2 to 5 $\mu$m in pore size is employed to remove the degradation products from the used brine.

According to the known distillation method, the base component of the used brine is recovered by distilling the used brine as described above. However, the brine relatively widely used in industries is generally diluted with water to 30 to 60% concentration and, therefore, the used brine can hardly be distilled efficiently, rendering the distillation method industrially unprofitable.

On the other hand, the known filtration method is, although effective to remove suspended particles from the used brine, ineffective to remove metal ions dissolved in the used brine. The presence of a large amount of the dissolved metal ions indicates a secondary corrosion has occurred in the metals comprising or located within the system to such an extent that an extra addition of one or more corrosion inhibitors will no longer exhibit a corrosion inhibiting function. Accordingly, the known filtration method little results in the used brine being recycled even though it has been filtered.

The inorganic brine is known as a solution of inorganic compounds such as, for example, calcium chloride and is very corrosive to metals comprising or located within the system, tending to form metal ions and corrosion byproducts relatively quickly. Because of this, in recycling the inorganic brine, the used inorganic brine is filtered through a mass of sands to remove the corrosion byproducts and other degradation products, but this technique is ineffective to remove dissolved metal ions from the used inorganic brine, posing a problem associated with the secondary corrosion as discussed above.

The heat transfer medium when used in the system similarly results in corrosion of metals comprising or located within the system, when it has degraded or deteriorated as a result of use for a period of time. Even the heat transfer medium accumulates the metal ions with passage of time of use thereof and eventually brings about the secondary corrosion. Therefore, even the used heat transfer medium is, when degraded or deteriorated, replaced with a fresh heat transfer medium.

It is most preferred to treat the used brine to yield a recycled product which may be introduced in the system for reuse, rather than disposing of as a waste product. However, as discussed hereinbefore, when the organic brine prepared by mixing the base component, i.e., glycol or alcohol, with the additives, for example, a corrosion inhibitor, is used as an anti-freezing liquid or a coolant, the base component is little deteriorated chemically, but the additives are extremely degraded with passage of time. Because of this, the organic brine used in the automobile engine cooling system comes to contain metal salts of the corrosion inhibitor used, metal oxides, precipitants such as gum, and a small quantity of metal ions and organic acids which are oxidized products of the base component of the brine, that is, glycol or alcohol, all mixed in the organic brine.

Of these impurities contained in the used organic brine, the precipitants can easily be removed by any known filtration method, but the filtration method fails to remove the metal ions. The organic acid metal salts do not precipitate because of chelation and remain dissolved in the used brine. In general, the used brine contains organic acids in a quantity ranging from some milligram per liter to some hundreds milligram per liter and metal ions in a quantity comparable to the quantity of the organic acids. As indicated above, the presence of the metal ions in the used brine, even though the used brine has been recycled, contributes to the secondary corrosion of the metals comprising or located within the system. In view of this, in order for the brine to be satisfactorily recycled, it is necessary to remove the dissolved metal ions thereby to avoid corrosion by the organic acids.

Similarly, as discussed above, the metal ions accumulate in the inorganic brine or the heat transfer medium.

Other known brine recycling methods are disclosed in, for example, U.S. Pat. Nos. 5,091,081 and 4,946,595. According to the first mention U.S. patent, a method is disclosed which generally comprises a prefiltration of the coolant, removed from an internal combustion engine cooling system, followed by a filtration of the prefiltered coolant with the use of a precision filtering membrane having a multiplicity of fine perforations. In this known method, no chemical treatment is effected and, therefore, no metal ion can be removed with the finely perforated filtering membrane.

The second mentioned U.S. patent discloses a method in which an oxidizing agent such as air or hydrogen peroxide is aerated or added into the coolant which has been removed from an internal combustion engine cooling system to reduce the unwanted dissolved metals and metal based byproducts, contained in the used coolant, into metal oxides which are subsequently removed by filtration with the use of first and second filters fluid-connected in series with each other and having respective perforations of 20 to 30 microns in size and 1 to 5 microns in size. It has, however, been found that, because the oxidizing agent such as air or hydrogen peroxide is little reactive with the metal ions present in the used coolant, the metal ions cannot be removed satisfactorily.

The Japanese Laid-open Patent Publication No. 3-43617, published in 1991, discloses an addition of a high molecular electrolytes and sodium dimethyl dithiocarbomate to the engine coolant to precipitate sulfides and metal ions, followed by a filtration of the suspended particles of 10 $\mu$m or more in particle size. However, as shown in the graph of FIG. 2 showing a measured distribution of distributed particle sizes in the coolant, about 30% of the suspended particles formed by the metal ion precipitants have a particle size smaller than 10 $\mu$m and, therefore, even though the suspended particles of 10 $\mu$m or more are filtered out, an entire amount of the suspended particles cannot be removed.

It is to be noted that FIG. 2 illustrates a graph showing the distribution of particle sizes of the suspended particles contained in a truck engine coolant, which was obtained by mixing 400 ppm of sodium dimethyl dithiocarbomate into the coolant and allowing the resultant mixture to react for a week.

It may be contemplated to add a coagulating agent to the coolant after the suspended particulate matter has been formed to therein by the use of a high molecular electrolyte, thereby flocculate the suspended particles so as to have an increased size, so that the suspended particles of an increased size can subsequently be removed by filtration. However, the coagulating agent used tends to remain in the recycled product and, when the recycled product is reused in the engine cooling system, minute particles present in the recycled coolant are flocculated in the presence of the residual coagulating agent, leaving unwanted flocs in the recycled coolant within the engine cooling system.

In any event, none of the prior art methods is found to be effective to treat the used brine to yield a satisfactorily reusable product.

SUMMARY OF THE INVENTION

The present invention has been developed to substantially eliminate or minimize the inconveniences and drawbacks found in the prior art methods and apparatuses and is intended to provide an improved method of and an improved apparatus for recycling used brine.

To this end, the present invention provides a brine recycling method wherein the used brine containing metal ions is added with a reaction agent to provide a agent-added brine. The reaction agent is of a kind which, when reacted with the metal ions produces an insoluble substance, excluding an oxidant which produces metal oxide. The agent-added brine is subsequently filtrated with the use of a microporous filtration membrane having an average pore size greater than 0.005 $\mu$m, but smaller than 1 $\mu$m and preferably within the range of 0.02 to 0.2 $\mu$m.

The present invention also provides a brine recycling apparatus which comprises a filter module containing a microporous filtration membrane having an average pore size greater than 0.005 $\mu$m, but smaller than 1 $\mu$m, a supply passage means for supplying the used brine containing metal ions and added with a reaction agent which, when reacted with the metal ion, produce an insoluble substance, into the filter module, a recovery passage means through which the brine which has been filtrated with the microporous filtration membrane within the filter module is recovered from the filter module.

According to the present invention, since the metal ion reaction agent is added to the used brine, the metal ions contained in the used brine precipitate satisfactorily. The use of the microporous filtration membrane having an average pore size greater than 0.005 $\mu$m, but smaller than 1 $\mu$m is effective to remove minute suspended particulate matter, which has been precipitated, with no need to use any coagulating agent such as employed in the practice of the prior art method.

Since as discussed above the metal ions are, after having been precipitated effectively, removed by filtration and since the use of any coagulating agent is dispensed with, the use of the brine, which has been recycled according to the present invention, in the physical system such as, for example, an automobile engine cooling system does not substantially result in an accumulation or deposition of particulate foreign matter within the system and, therefore, if the recycle brine is added with a corrosion inhibitor and other agents, the recycled brine can be reused as a fresh brine.

DETAILED DESCRIPTION OF THE INVENTION

The metal ion reaction agent (hereinafter referred to as "reaction agent") that can be employed in the practice of the present invention may be any known reaction agent. It may preferably include one or a mixture of dithio carbamic acid salts, thioureas, thiazoles and triazoles.

Any of these ion reaction agents referred to above can overcome chelation to precipitate the metal ions into an insoluble substance. These compounds (iron reaction agents) are susceptible to reaction and some of the non-reacted compounds dimerize themselves to precipitate and do not, therefore, remain in the brine. Because of this, precipitated particles can easily be filtrated by the microporous filtration membrane having a pore size of 1 or less micron.

Examples of the reaction agents which may be employed in the present invention include dithiocarbamates such as, for example, alkali metal salts or ammonium salts of dimethyl dithiocarbamic acid, diethyl dithiocarbamic acid, isopropyl dithiocarbamic acid, or dibutyl dithio carbamic acid; thioureas such as, for example, N,N'-dimethylthiourea or 1,3-diethylthiourea; thiazoles such as, for example, 2-mercapto-benzothiazole, 1,3-thiazole, 4,5,6,7-tetrahydrobenzothiazole and alkali metal salts or ammonium salts thereof; triazole such as, for example, benzotriazole, di(2-ethylhexyl)-aminomethytolyltriazole, 5,5'-methylene-bis-benzotriazole or 1,2,4-triazole.

The reaction agent utilizable in the practice of the present invention is preferably water-soluble, but may be of a kind that is hard to dissolve in water.

The amount or concentration of the reaction agent in the used brine may not be specifically limited, but is preferably within the range of 10 milligram per liter to 10% by weight relative to the total weight of the used brine and, more preferably, within the range of 50 to 30,000 milligram per liter. While reaction takes place immediately after the addition of the reaction agent to the used brine, a complete reaction can be expected if a substantial length of reaction time is afforded. As a matter of course, the higher the concentration of the reaction agent in the used brine, the greater the reaction time before the complete reaction takes place. Also, the higher the temperature at which the reaction takes place, the smaller the reaction time.

Of the various reaction agents that can be employed in the practice of the present invention, dithiocarbamate is preferred because of its superior reactivity with the metal ions and, hence, the use thereof may result in a higher amount of removal of the metal ions from the used brine.

The metal ions, dissolved in the used brine, and the reaction agent added to the used brine precipitate into water-insoluble precipitants after the metal ions have been reacted with the reaction agent and also after the reaction agent has dimerized itself. The water-insoluble precipitants so formed can be removed by filtration with the use of a microporous filtration membrane.

The microporous filtration membrane that can be employed in the practice of the present invention must have an average pore size greater than 0.005 μm, but smaller than 1 μm. If the average pore size is smaller than 0.005 μm, micropores of the filtration membrane are susceptible to occlusion, leading to a reduction in flux and also a reduction in efficiency of refinement. On the other hand, if the average pore size is greater than 1 μm, no satisfactory removal of SS (suspended solid) components can be achieved. In order to accomplish a satisfactory removal of the SS components without being accompanied by a reduction in flux, the microporous filtration membrane used in the practice of the present invention is preferred to have an average pore size within the range of 0.02 to 0.2 μm.

The average pore size referred to hereinabove and hereinafter is to be understood as defined a pore size with which 90% of standard particulate matter, such as colloidal silica, emulsion or latex, of which particle size is known, can be filtrated through the microporous filtration membrane used in the present invention. While the microporous filtration membrane usable in the present invention may preferably have a uniform pore size.

The microporous filtration membrane that can be used in the practice of the present invention may be in the form of one or more flat filtration membranes, one or more filtration tubes or a bundle of microporous hollow fibers. Of them, the use of the bundled microporous hollow fibers is preferred.

Microporous hollow fibers may be prepared by the use of a standard spinning method (a wet spinning method, a dry spinning method or a fusion spinning method) using cellulose acetate, polyacrylonitrile, polymethacrylic acid ester, polyamide, polyester, polyvinyl alcohol, polyolefine, or polysulfone, or inorganic microporous filtration membrane made of ceramics, etc. Where the polymer membrane is employed, it should be understood that the microporous filtration membrane includes the one co-polymerized with not greater than 30 mol %, or not greater than 20 mol % in a certain case, of other material and, also, the one blended with not greater than 30% by weight, or not greater than 20% by weight, of other material.

In any event, the use of the microporous filtration membrane made of polyvinyl alcohol is preferred because of its stability over a wide range of pH values, and the use of the microporous filtration membrane which can withstand a heated water of 50° to 90° C. is more preferred because, if the temperature employed during a filtration process is elevated, the process speed can be increased.

Because of the foregoing reason, of the various microporous filtration membranes made of polyvinyl alcohol, the microporous filtration membrane made of cross-linked polyvinyl alcohol linked by polyhaldehyde such as, for example, glutaraldehyde having a high heat resistance and an excellent physical property such as disclosed in Japanese Laid-open Patent Publications No. 52-21420 and No. 54-117380, or the microporous filtration membrane made of cross-linked polyvinyl alcohol linked by both of monoaldehyde such as, for example, formaldehyde, and polyaldehyde such as, for example, glutaraldehyde, is more preferably employed in the practice of the present invention.

Where the bundled microporous hollow fibers are employed, each microporous hollow fiber should have an outer diameter within the range of 200 to 5,000 μm and, preferably, within the range of 500 to 2,000 μm, and a fiber thickness within the range of 50 to 500 μm and, preferably, within the range of 100 to 400 μm. In the practice of the present invention, the hollow fiber bundle is accommodated within a filter module. The hollow fiber bundle (some tens to some hundred thousands of microporous hollow fibers in a bundled configuration) may be housed within the filter module in the form as bent so as to represent a generally U-shaped configuration, as sealed at one end with the sealed ends bundled or left free or as open-ended. Of them, the use of the filter module having the bundled configuration of the microporous hollow fibers sealed at one ends and supported within the filter module with the sealed ends of the hollow fibers left free is preferred. While the used brine can be filtrated by passing exteriorly (external pressure type) or interiorly (inner pressure type) through the microporous hollow fibers, the external pressure type is preferred.

In the practice of the present invention, a gaseous medium (or a germ-free gaseous medium if desired) with the gauge pressure of 0.5 to 10 kg/cm$^2$ may be introduced into the filter module in the counter direction to remove SS components deposited on the microporous hollow fibers within the filter module. If the pressure of the gaseous medium is lower than 0.5 kg/cm$^2$, a sufficient flushing effect cannot be obtained but if the pressure is higher than 10 kg/cm$^2$, the pressure is too high and is therefore undesirable in terms of energy saving and pressure resistance required in the system. The higher pressure of the gaseous medium may occasionally result in a destruction of the microporous hollow fibers.

The gaseous medium referred to above and utilizable for flushing purpose may be air. Either after the use of the microporous hollow fiber bundle through the filtration process or after the flushing thereof, the microporous hollow fibers may be treated with a rinsing agent to remove organic and/or inorganic matter deposited thereon. The treatment with the use of the rinsing agent, which may be employed in the practice of the present invention for reviving the microporous hollow fibers, includes a process of removing the organic and/or inorganic deposits with the use of sodium hydroxide as a rinsing agent; a process of removing metal deposits with the use of acid such as, for example, an inorganic acid including hydrochloric acid and sulfuric acid, or an organic acid including formic acid, oxalic acid and sulfamic acid, preferably with the use of hydrochloric acid; a treatment with sodium hydroxide followed by a treatment with acid; and a treatment with acid followed by a treatment with sodium hydroxide. In particular, the use of an alkaline fluid heated to a temperature within the range of 50° to 90° C. is extremely effective in reviving the micro-porous hollow fibers employed in the present invention.

Instead of the gaseous medium, water may be equally employed for flushing the filter module.

The gas or water flushing and/or the rinsing, referred to above, may be executed by the use of a programmed sequence controller. By way of example, the sequence controller may be so programmed that several cycles of gas flushing can be followed by one or some cycles of water flushing then followed by a cycle of rinsing. This programmed sequence control permits the recycling system to run for a prolonged period of time in a stabilized fashion while the filtration process and the flushing process alternate with each other. A so-called select switching technique may also be employed in which the microporous hollow fibers are manually rinsed only when and after a majority of pores of the microporous hollow fibers has come to be clogged with unwanted deposits to an extent that the programmed sequence control under which the filtration and the flushing processes alternate with each other no longer remove the unwanted deposits.

It is to be noted that, if the reaction time is short and the concentration of the reaction agent in the used brine is small as compared with the concentration of the metal ions contained in the used brine, a complete removal of the dissolved metal ion may be hard to achieve. In such case, the use of a cation exchange resin or a dual ion (cation/anion) exchange resin may be employed to remove a small quantity of the metal ions remaining in the brine which has been filtrated.

The brine which has been filtrated with the microporous filtration membrane and then purified by the ion exchanger contain a reduced quantity of the corrosion inhibitor and other additives, and therefore, such brine may be added with an additional quantity of the corrosion inhibitor and other additives before it is reused in the system, for example, the cooling system. While the corrosion inhibitor includes phosphates, amine nitrites, nitrates, molybdates, benzoates, amines and triazoles, the particular corrosion inhibitor varies with type of brine. Accordingly, although the additive should be chosen in consideration of the composition of the brine, the addition capable of exhibiting a higher corrosion inhibiting effect may be made to the brine.

The amount of the additive to be added to the brine may be excessive to a certain extent. It is, however, recommended from the standpoint of economy that a relatively large amount of the additive of a nature quick to be degraded or a relatively small amount of the additive of a nature slow to be degraded should be employed. The additive quick to be degraded includes triazoles, amines and nitrites while the additive slow to be degraded includes phosphates, nitrates, molybdates and benzoates.

As hereinbefore indicated, the present invention also provides the improved brine recycling apparatus. Preferably, the supply passage means includes a brine storage tank, a supply passage and a pump means for pumping the used brine from the brine storage tank towards the filter module through said supply passage.

Also preferably, the filter module has primary and secondary sides divided by the microporous filtration membrane. In such case, the supply passage comprises a supply conduit fluid-connected between the pump means and the filter module for introducing the used brine pumped by the pump means into the primary side of the filter module, and a sluice valve disposed on said supply conduit. A return conduit may be connected at one end with a portion of the supply conduit between the pump means and the sluice valve and at the other end communicated with the brine storage tank for returning a portion of the used brine discharged from the pump means back to the brine storage tank. This return conduit has a first flow regulating valve disposed thereon for regulating the flow of that portion of the used brine.

If desired, the brine recycling apparatus may also comprises a recirculating conduit fluid-connected at one end with the primary side of the filter module and at the other end communicated with the brine storage tank for recirculating the used brine back to the brine storage tank, and a second flow regulating valve disposed on the recirculating conduit for regulating the flow of the used brine to be recirculated back to the brine storage tank through said recirculating conduit.

Again preferably, one or both of an ion exchanger and a flushing circuit may be employed. If employed, the ion exchanger is disposed downstream of the filter module with respect to a direction of flow of the brine. The flushing circuit is operable to supply a fluid medium, preferably air under pressure, into the filter module so as to pass through the microporous filtration membrane in a direction counter to the direction of flow of the used brine through the microporous filtration membrane. This flushing circuit if used is fluid-connected with the secondary side of the filter module.

When the brine recycling apparatus embodying the present invention is to be operated, all of the valves are closed prior to the start of the brine recycling apparatus. With the valves closed, the used brine, i.e., the brine recovered from, for example, an automobile engine cooling system, is charged into the brine storage tank into which the chosen reaction agent is added. After the addition of the metal ion reaction agent into the brine storage tank, the first flow regulating valve is opened followed by a drive of the pump to supply the used brine under pressure back to the brine storage tank through the return conduit. As the used brine is recirculated from the brine storage tank back to the brine storage tank, a reaction between the metal ions contained in the used brine and the added reaction agent is enhanced to facilitate suspension of the mixture.

After the used brine has been sufficiently reacted with the reaction agent, the sluice valve on the supply duct is opened to supply the used brine in part to the filter module which subsequently discharges a filtrate. The filtrate is discharged from the filter module through the recovery conduit.

The rate of flow of the used brine towards the filter module can be controlled by adjusting the first flow regulating valve. Also, by adjusting the second flow regulating valve, the system operator can choose one of a partial filtration mode, in which a fraction of the used brine can be filtrated, and a total filtration mode in which the entire amount of the used brine can be filtrated.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENT

Figure 1:
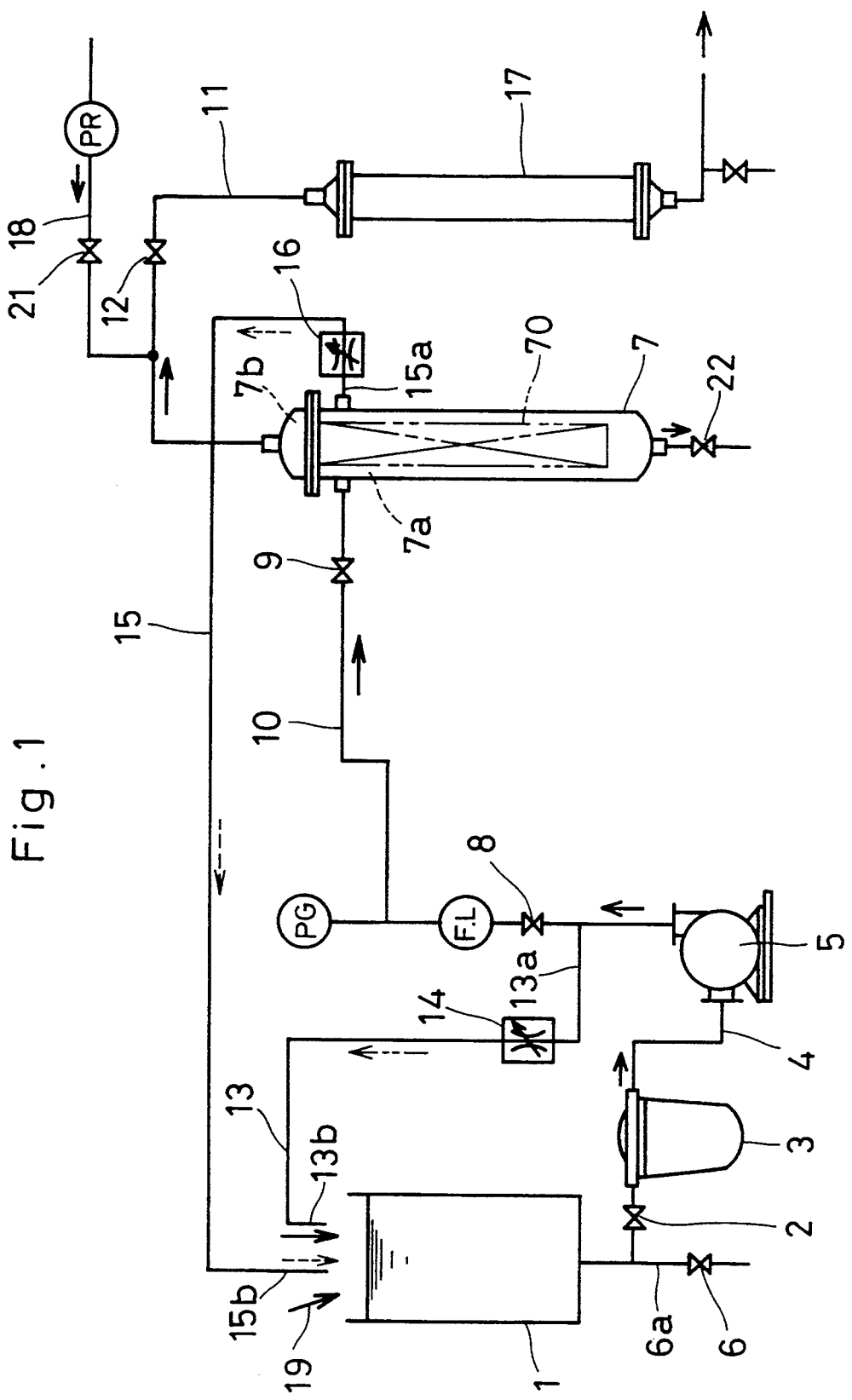
FIG. 1 is a schematic diagram showing a layout of a brine recycling apparatus embodying the present invention.
Figure 2:
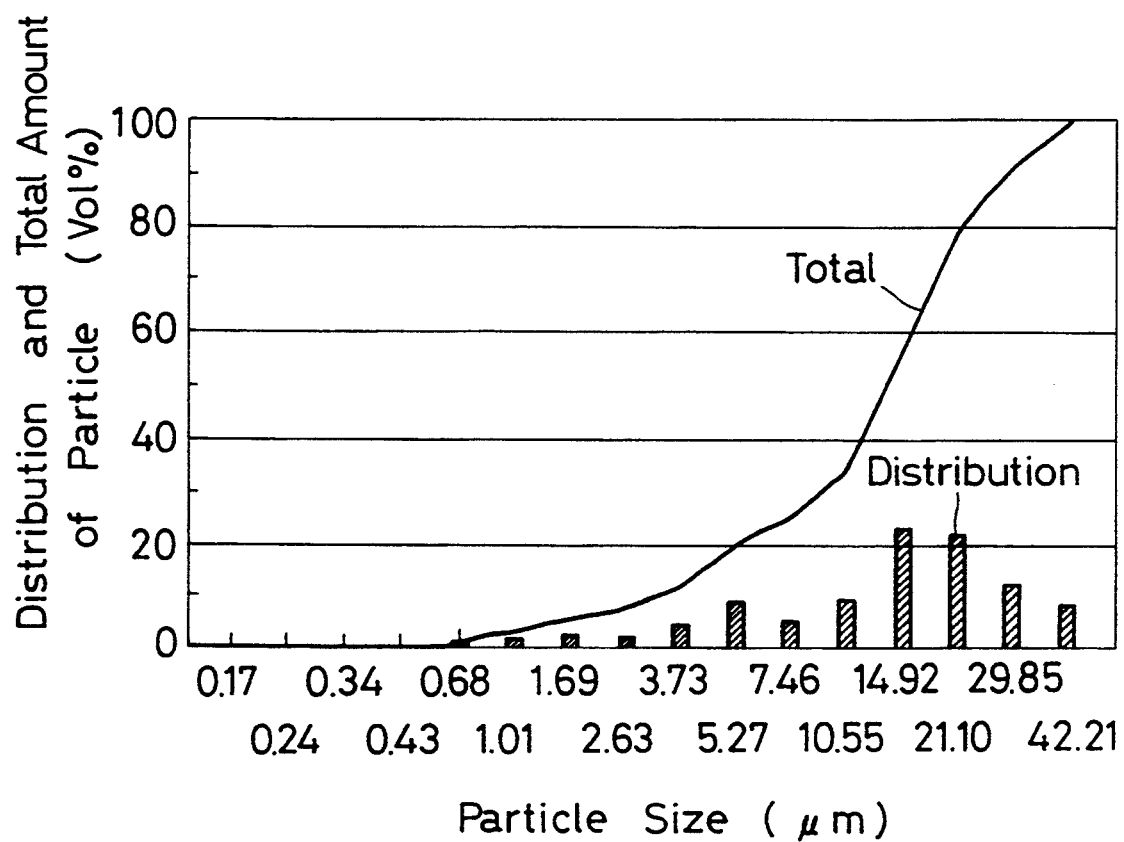
FIG. 2 is a graph showing the pattern of distribution of particle sizes of suspensions obtained when a metal ion reaction agent is mixed in a used coolant.

Referring now to FIG. 1, a brine recycling apparatus shown therein according to the present invention includes an open-topped brine storage tank 1 for accommodating a quantity of used brine to be recycled which has been removed from, for example, an automobile engine cooling system. The brine storage tank 1 has defined at its bottom thereof a discharge port which is fluid-connected with a pump 5 by way of a sluice valve 2 and a prefilter 3 through a supply conduit 4. The discharge port at the bottom of the brine storage tank 1 is also communicated to the outside through a discharge conduit 6a branched off from a portion of the supply conduit 4 between the brine storage tank 1 and the sluice valve 2 and including a normally closed discharge valve 6.

Figure 3:
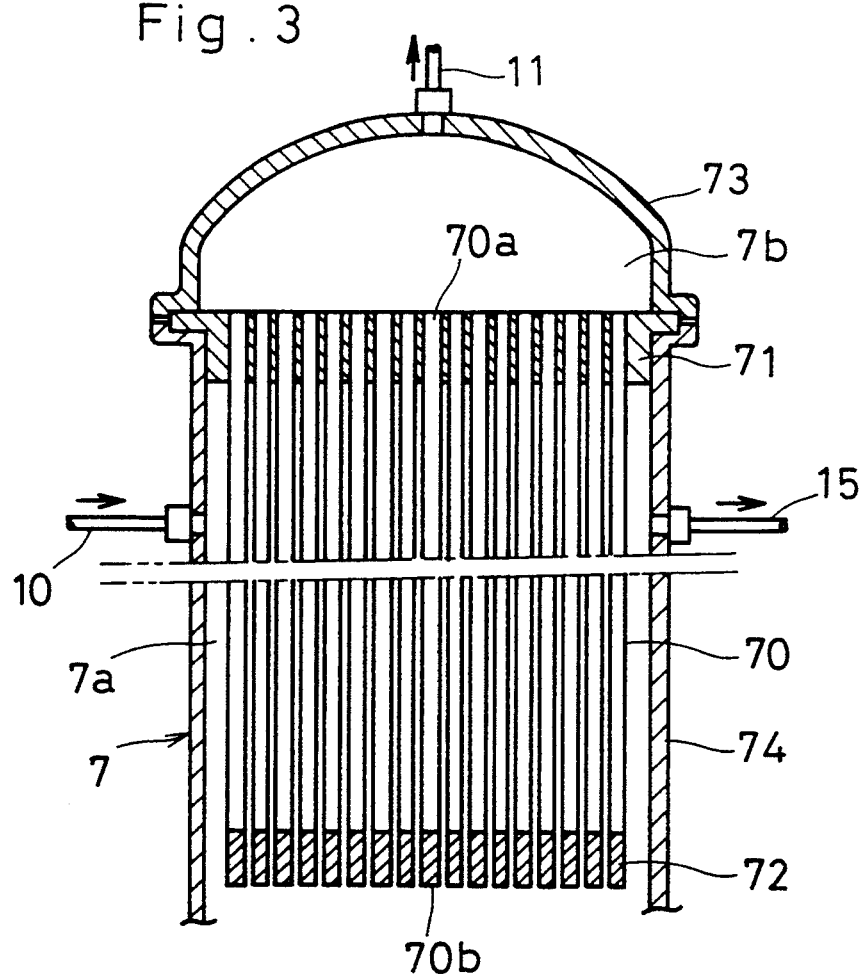
FIG. 3 is a schematic longitudinal sectional view showing one example of a filter module which may be employed in the present invention.

The brine recycling apparatus also includes a generally cylindrical filter module 7 comprising a microporous membrane 70 having an average pore size greater than 0.005 μm and smaller than 1 μm. The microporous membrane 70 within the filter module 7 is preferably in the form of a bundled configuration of microporous hollow fibers as shown in FIG. 3 and which is well known in the art and divides the interior of the filter module 7 into a primary side (or a suspension chamber) 7a and a secondary side (or a filtrate chamber) 7b. As shown in FIG. 3, the bundled microporous hollow fibers forming the microporous membrane 70 are open at an upper end 70a thereof, but closed at a lower end 70b by means of a seal member 72. The bundled microporous hollow fibers are supported within the filter module 7, comprised of upper and lower casings 73 and 74, with the open ends 70a fixedly retained by a flanged fixture 71 while the flange of the flanged fixture 71 is firmly clamped between the upper and lower casings 73 and 74. The sealed lower ends 70b of the microporous hollow fibers are left free within the lower filter casing 74.

The primary side 7a of the filter module 7 is fluid-coupled with a discharge port of the pump 5 through a connecting conduit 10 by way of sluice valves 8 and 9. The connecting conduit 10 is fluid-connected with a flowmeter FL used to provide a visual indication of the rate of flow of the used brine in the connecting conduit 10 towards the filter module 7 and, also, a pressure gauge PG used to monitor the pressure of the primary side 7a of the filter module 7.

The secondary side 7b of the filter module 7 is fluid-coupled with an ion exchanger 17 through a recovery conduit 11 by way of a sluice valve 12. A portion of the recovery conduit 11 between the secondary side of the filter module 7 and the sluice valve 12 is communicated with an air flushing circuit 18 for introducing air under high pressure into the filter module 7 to revive the microporous filtration membrane 70 used therein. This air flushing circuit 18 includes a sluice valve 21.

A return conduit 13 extends from the discharge port of the pump 5 back to the brine storage tank 1 for recirculating the filtered brine discharged from the pump 5 back to the brine storage tank 1 and has, for this purpose, one end 13a fluid-connected to a portion of the connecting conduit 10 between the pump 5 and the sluice valve 8 and the other end 13b opening into the open top of the brine storage tank 1. This return conduit 13 includes a first flow regulating valve 14 disposed thereon.

The filter module 7 is again fluid-coupled with the brine storage tank 1 through a recirculating conduit 15 for recirculating the brine, which has been filtered by the filter module 7, back to the brine storage tank 1. This recirculating conduit 15 has one end 15a fluid-connected with the primary side 7a of the filter module 7 and the other end 15b opening into the open top of the brine storage tank 1 and includes a second flow regulating valve 16 disposed thereon.

It is to be noted that the use of any one of the air flushing circuit 18 and the ion exchanger 17 may not be always essential in the practice of the present invention and, therefore, one or both of them may be dispensed with if desired.

The brine recycling apparatus shown in and described with reference to FIG. 1 operates in the following manner. Assuming that the discharge valve 6, the sluice valves 8 and 12 and the first and second flow regulating valves 14 and 16 are closed, and that a quantity of used brine is filled in the brine storage tank 1, an operator of the system adds a metal ion reaction agent to the used brine within the brine storage tank 1 as indicated by the arrow 19. When the pump 5 is driven subsequent to the addition of the metal ion reaction agent and after the sluice valve 2 and the first flow regulating valve 14 have been opened, the used brine within the brine storage tank 1 is drawn into the supply conduit 4, flowing through the prefilter 3 and then into the return conduit 13 through the pump 5, finally returning to the brine storage tank 1. While the used brine within the brine storage tank 1 is recirculated into the brine storage tank 1 through the supply conduit 4 and then through the return conduit 13 in the manner described above, metal ions and the reaction agent both contained in the used brine react with each other to facilitate a suspension of the used brine.

After the metal ions and the reaction agent in the used brine have sufficiently reacted with each other, the first flow regulating valve 14 is partially closed and both of the sluice valves 8 and 12 and the second flow regulating valve 16 are opened to allow a portion of the used brine discharged from the pump 5 to be introduced into the filter module 7 through the connecting conduit 10 so as to filtrate the used brine. The resultant filtrate formed by filtrating the used brine is removed from the filter module 7 through the recovery conduit 11. Where the discharge pressure of the pump 5 is low, the first flow regulating valve 14 which has been described as partially closed may be full closed.

The rate of flow of that portion of the used brine to the filter module 7 while the sluice valves 8 and 9 are opened can be adjusted by adjusting the first flow regulating valve 14 so as to regulate the flow of the used brine to be returned to the brine storage tank 1 by way of the return conduit 13 and, similarly, the rate of flow of the brine to be returned to the brine storage tank 1 through the recirculating conduit 15 can be adjusted by adjusting the second flow regulating valve 16, thereby enabling the system operator to choose one of a partial filtration mode and a total filtration mode. As a matter of design, during the total filtration mode, the second flow regulating valve 16 is full closed to permit the total amount of the used brine, introduced into the primary side 7a of the filter module 7, to be filtrated to provide the filtrate which is subsequently discharged from the secondary side 7b of the filter module 7.

Where the ion exchanger 17 is employed such as shown, the filtered brine discharged from the filter module 7 is passed through the ion exchanger 17 through the recovery conduit 11 to further purify the filtered brine. The air flushing circuit 18 if used such as shown supplies the compressed air into the filter module 7 through a pressure gauge PR having a pressure adjusting capability to revive the microporous filtration membrane 70 used therein and, for this purpose, the sluice valve 21 and a vent valve 22, disposed on a vent duct leading from the bottom of the filter module 7, have to be opened. The used flushing air and suspended solid components forced to separate from the microporous membrane within the filter module 7 are discharged through the vent valve 22.

Hereinafter, the present invention will be demonstrated by way of examples in comparison with the prior art methods.

EXAMPLE 1

For testing purpose in this Example, a coolant comprising ethylene glycol and recovered from an engine cooling system of a taxi was used. As a reaction agent which reacts with metal ions contained in the brine, that is, the recovered engine coolant, sodium diethyl dithiocarbomate was added to the brine in a varying quantity (percent by weight relative to the total weight of the brine) to give a varying concentration of the reaction agent as shown in Table 1, and the resultant mixture was allowed to undergo reaction for a varying time as shown in Table 1.

The brine added with the reaction agent was then filtrated through a filter module of a type employing a closely bundled configuration of microporous hollow fibers (each having a uniform microporosity of 0.1 $\mu$m in pore size, 800 $\mu$m in outer diameter and 400 $\mu$m in inner diameter) made of heat resistant polyvinyl alcohol cross-linked by the use of glutaraldehyde and formaldehyde. (In this filter module, the microporous hollow fibers in a closely bundled configuration are freely sealed at one end and operable with external pressure.)

Results of experiments conducted are shown in Table 1 together with a comparison.

TABLE 1

| | | (Unit: mg/l (%)) | | | | |
| --- | --- | --- | --- | --- | --- | --- |
| | | Comparison | | Invention | | |
| Type of | Amount in | Amount in | Reaction | Reaction Agent Content | | |
| Metal Ions | Coolant (mg/l) | Filtrate (mg/l) | Time (min) | 0.1 wt % | 1 wt % | 3 wt % |
| Total Iron | 355.0 | 277.0 | 10 | 45.0 (87) | 28.6 (92) | 10.4 (97) |
| Total Copper | 5.9 | 0.9 | | 0.9 (85) | 0.6 (90) | 0.4 (93) |
| Total Zinc | 19.1 | 17.5 | | 3.5 (82) | 2.1 (89) | 1.7 (91) |
| Total Iron | | | 60 | 14.2 (96) | 6.7 (98) | 2.5 (99) |
| Total Copper | | | | 0.3 (95) | 0.1 (98) | 0.1 (98) |
| Total Zinc | | | | 1.2 (94) | 0.8 (96) | 0.6 (97) |
| Total Iron | | | 1,440 | 3.3 (99) | 1.0 (99) | 0.6 (99) |
| Total Copper | | | | 0.1 (98) | 0.1 (98) | 0.1 (98) |
| Total Zinc | | | | 1.2 (94) | 0.1 (99) | 0.1 (99) |

In Table 1 above, numerals in the parentheses represent the amount of removal R which is expressed in term of percentage by weight and is calculated using the following equation:

$$R(\%) = 100 - (IC/MC) \times 100$$

wherein IC represents the concentration of metal ions contained in the filtrate added with the reaction agent and MC represents the concentration of metals contained in the coolant recovered from the cooling system.

The filtrate referred to in Table 1 under the heading of "COMPARISON" is the one obtained by filtrating the recovered coolant through the precision filtration membrane having an average pore size of 0.45 μm. As Table 1 above makes it clear, the mere filtration of the recovered coolant removes little metal ions, but removes muddy impurities. On the other hand, the addition of the reaction agent according to the present invention is effective to remove the metal ions which were not be removed by the mere filtration. As Table 1 indicates, the greater the amount of the reaction agent added and/or the longer the reaction time, the higher the amount of removal of the metal ions. In any event, as compared with the prior art method in which the mere filtration is employed, 87% removal has been indicated even with the reaction time of 10 minutes.

EXAMPLE 2

For testing purpose in this Example, brine comprising propylene glycol and having been used as a freezing medium in an ice arena was used. As a reaction agent, sodium dimethyldithiocarbomate was added to the brine in a quantity equal to 0.2% by weight relative to the total weight of the brine. Using the filter module employed in Example 1 above, the brine added with the reaction agent was treated in the system of the present invention shown in FIG. 1 to give a reacted filtrate. The reacted filtrate so obtained from the system of FIG. 1 was subsequently processed through a dual ion exchange resin to provide a purified filtrate.

Results of the experiment conducted are shown in Table 1 together with a comparison.

TABLE 2

| | | | | |
|---|---|---|---|---|
| | (Unit: mg/l (%)) | | | |
| | Amount | Comparison | Invention | |
| Type of Metal Ions | in Brine (mg/l) | Amount in Filtrate (mg/l) | Reacted Filtrate | Filtrate after Ion Exchanger |
| Total Iron | 22.3 | 6.3 | 1.7 (92) | Not Detected (100) |
| Total Copper | 0.8 | 0.2 | Not Detected | Not Detected (100) |
| Total Zinc | 158.7 | 115.0 | 35.2 (78) | 1.0 (99) |
| Total Lead | 10.6 | 3.0 | 0.3 (97) | Not Detected (100) |
| Total Tin | 8.3 | 1.9 | 0.1 (99) | Not Detected (100) |

As is the case in Example 1, numerals in the parentheses represent the amount of removal R calculated using the previously defined equation.

As Table 2 makes it clear, the mere filtration has removed little metal ions. The addition of the reaction agent according to the present invention has resulted in 78% removal of zinc, leaving 35 mg/l of zinc ions in the filtrate. However, 99% removal of zinc ions was exhibited when the filtrate was subsequently passed through the ion exchanger.

EXAMPLE 3

Performance tests were conducted to determine the applicability of any one of dithiocarbamic acid salts in the practice of the method of the present invention. The reaction agents employed for this testing included sodium dimethyl-dithiocarbomate (NaMDC), ammonium diethyl-dithiocarbomate (NH4EDC) and potassium dimethyl-dithiocarbomate (KMDC). Each of these reaction agents was added to the brine to give a concentration of 1,000 mg/l while the reaction time was set to 15 minutes for each agent-added brine. The ion concentration in the used brine and the content of the metal ions remaining in the reacted filtrate obtained by filtrating the respective agent-added brine with a flat filtration membrane having an average pore size of 0.45 μm are shown in Table 3.

Figure 4:
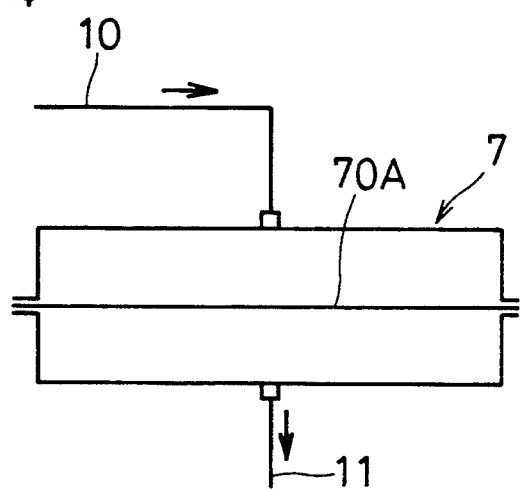
FIG. 4 is a schematic diagram showing another example of the filter module which may be employed in the present invention.

It is to be noted that the flat filtration membrane employed in this Example is shown in FIG. 4 and is in the form of a microporous membrane 70A supported within the filter module 7 to allow the brine to flow thereacross in a direction generally perpendicular thereto.

TABLE 3

| | | | | | |
|---|---|---|---|---|---|
| | (Unit: mg/l) | | | | |
| | Total Iron | Total Copper | Total Zinc | Total Lead | Total Tin |
| Used Brine | 14.8 | 3.0 | 3.1 | 0.8 | 6.1 |
| NH4EDC | 1.1 | 0.2 | 0.7 | 0.1 | 0.6 |
| KMDC | 1.0 | 0.2 | 0.6 | 0.1 | 0.5 |
| NaMDC | 1.0 | 0.2 | 0.5 | 0.1 | 0.7 |

From Table 3 above, it is clear that dithiocarbamic acid salts other than sodium dimethyl-dithiocarbomate can be equally employed in the practice of the present invention for the satisfactory removal of the metal ions contained in the used brine.

EXAMPLE 4

Similar performance tests were conducted to determine the applicability various reaction agents in the practice of the present invention. The reaction agents employed for this testing included ammonium diethyl-dithiocarbomate (NH4EDC) as a representative of the dithiocarbamic acid salts, 2-mercaptobenzothiazole (MBT), benzotriazole (BT), 2-mercaptobenzoxazole (NBX) and 2-mercapto-thiazoline (MT). Each of these reaction agents was added to the brine to give a varying concentration of 100 to 1,000 mg/l while the reaction time was set to 30 minutes for each agent-added brine. The ion concentration in the used brine and the content of the metal ions remaining in the reacted filtrate obtained by filtrating the respective agent-added brine with a flat filtration membrane having an average pore size of 0.45 μm are shown in Table 4. It is to be noted that in Table 4 below,—indicates that the amount detected is very slight.

From Table 4, it is clear that the use of the dithiocarbamic acid salts gives a superior result in metal ion removal to that of any of the other reaction agents. However, even though thiazoles and triazoles are employed, they can result in a removal of the metal ions to a certain extent if the reaction time, the amount to be added and/or the reaction temperature are selected properly.

TABLE 4

| | | | | |
|---|---|---|---|---|
| | (Unit: mg/l) | | | |
| | Amt Added | Total Iron | Total Copper | Total Zinc |
| Used Brine | | 52.5 | 1.5 | 2.8 |
| NH4EDC | 100 | 10.2 | 0.1 | — |
| | 1,000 | 3.3 | — | — |
| | 10,000 | 3.0 | — | — |
| MBT | 100 | 50.2 | 1.0 | 1.3 |
| | 1,000 | 38.5 | 0.1 | 0.1 |
| | 10,000 | 35.2 | 0.1 | 0.1 |
| BT | 100 | 48.2 | 1.5 | 2.5 |
| | 1,000 | 40.0 | 1.0 | 1.8 |
| | 10,000 | 35.2 | 1.0 | 1.3 |
| MBX | 100 | 49.8 | 1.0 | 2.5 |
| | 1,000 | 40.5 | 1.0 | 2.0 |
| | 10,000 | 36.5 | 0.8 | 2.2 |

TABLE 4-continued

| | (Unit: mg/l) | | |
|---|---|---|---|
| | Amt Added | Total Iron | Total Copper | Total Zinc |
| MT | 100 | 50.0 | 1.3 | 2.0 |
| | 1,000 | 40.2 | 1.2 | 1.9 |
| | 10,000 | 38.2 | 1.2 | 1.3 |

EXAMPLE 5

Performance with thioureas and other reaction agents, as shown in table 5, was tested. The used brine were added with 1,000 mg/l of thioureas and 200 mg/l of the other reaction agents as shown in table 5. The reaction time was 30 minutes for each reaction agent. The ion concentration in the used brine and the content of the metal ions remaining in the filtrate obtained by filtrating the respective agent-added brine with a flat filtration membrane having an average pore size of 0.45 $\mu$m are shown in Table 5.

TABLE 5

| | (Unit: mg/l) | | |
|---|---|---|---|
| | Total Iron | Total Copper | Total Zinc |
| Used Brine | 36.2 | 1.6 | 3.7 |
| N,N'-dimethyl Thiourea | 24.3 | 1.4 | 2.4 |
| 1,3-diethyl Thiourea | 31.2 | 1.1 | 3.7 |
| Thiourea | 26.3 | 0.9 | 3.0 |
| Lanthanum Chloride | 25.5 | 0.5 | — |
| Zirconium Chloride | 20.0 | 0.5 | — |

Table 5 above makes it clear that in the practice of the method of the present invention, various metal ion reaction agents can be conveniently employed.

EXAMPLE 6

In order to determine the type of a reaction agent effective to minimize lead and tin contained in the used brine, various reaction agents as shown in Table 6 were tested. Each of the reaction agents was added to the brine to give a concentration of 1,000 mg/l while the reaction time was set to 30 minutes for each agent-added brine. The ion concentration in the used brine and the content of the metal ions remaining in the filtrate obtained by filtrating the respective agent-added brine with a flat filtration membrane having an average pore size of 0.45 $\mu$m are shown in Table 6.

TABLE 6

| | (Unit: mg/l) | |
|---|---|---|
| | Total Lead | Total Zinc |
| Used Brine | 3.9 | 2.1 |
| Ammonium Dimethyldithiocarbamate | 0.2 | 0.5 |
| Potassium Dimethyldithiocarbamate | 0.4 | — |
| Lanthanum Chloride | 0.4 | — |
| Zirconium Chloride | 0.3 | — |
| Benzotriazole | 3.7 | 2.0 |
| 2-mercapto-benzothiazole | 3.6 | 1.9 |
| Thiourea | 3.1 | 1.9 |

From Table 6 above, it is clear that, other than dithiocarbamic acid salts, salts of rare earth metal such as lanthanum chloride or zirconium chloride can be effectively employed in the practice of the method of the present invention.

It is to be noted that, the experiments demonstrated under any one of Examples 3 to 6 described above were carried out in a laboratory under a simulated condition by flowing the used brine under pressure with the use of a syringe and the use of the microporous filtration membrane having an average pore size of 0.45 $\mu$m was satisfactory to remove the metal ions. However, when it comes to the treatment of the used brine on an industrial scale, the brine is supplied under higher pressure delivered by the pump 5 as shown in FIG. 1 than that delivered by the syringe and, therefore, it is suspected that the pores in the microporous filtration membrane may be enlarged under the influence of the high pressure of the used brine then pumped. In view of this, in the practice of the method of the present invention, the use of a microporous filtration membrane having an average pore size of 0.2 $\mu$m or smaller is preferred.

EXAMPLE 7

The reacted filtrate and the purified filtrate both obtained in Example 2 discussed above were added with a corrosion inhibitor, a defoaming agent and others to provide a reacted and filtrated brine and an ion-exchanged brine, respectively. The used brine, the filtrate obtained with no reaction agent added, the reacted filtrate (i.e., the filtrate obtained with the specific reaction agent used under Example 2), the purified filtrate under Example 2, and the reacted and filtrated brine and the ion-exchanged brine were tested to determine the corrosion inhibiting power according to a method stipulated in JIS K 2234 for the anti-freezing liquid, results of which are shown in Table 7.

TABLE 7

| | (Unit: mg/cm$^2$) | | | |
|---|---|---|---|---|
| | Copper | Brass | Steel | Cast Iron |
| Used Brine | −0.38 | −0.14 | −0.22 | −0.33 |
| Filtrate with no agent | −0.32 | −0.13 | −0.20 | −0.31 |
| Reacted Filtrate | −0.26 | −0.10 | −0.14 | −0.23 |
| Purified Filtrate | −0.26 | −0.13 | −0.13 | −0.21 |
| Reacted & filtrated Brine | −0.02 | −0.03 | −0.04 | −0.02 |
| Ion-exchanged Brine | −0.02 | −0.01 | −0.04 | −0.02 |

From Table 7 above, it is clear that, since the amount of the corrosion inhibitor remaining in the used brine, the filtrate with no reaction agent added and the purified filtrate is small and, in particular, little corrosion inhibitor for copper remains therein, the corrosion inhibiting power is little observed. However, the recycled brine added with the additives (that is, the reacted and filtered brine and the ion-exchanged brine, both referred to in Table 7) has exhibited a corrosion inhibiting power sufficient for the recycled brine to be reused as a fresh brine.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, in the practice of the present invention, although reference has been made to the use of a single reaction agent, two or more of the reaction agents employable in the present invention may be used.

Accordingly, such changes and modifications are, unless they depart from the scope of the present invention as delivered from the claims annexed hereto, to be construed as included therein,

What is claimed is:

1. A method of recycling a used brine containing metal ions, said method comprising the steps of:

adding a reaction agent to said used brine to provide an agent-added brine, said reaction agent producing an insoluble substance when reacted with said metal ions;

filtrating said agent-added brine through a microporous filtration member having an average pore size greater than 0.005 μm and smaller than 1 μm, wherein said reaction agent contains at least dithiocarbamic acid salt and is selected from a group consisting of dithiocarbamic acid salt, thiourea, thiazole, and triazole.

2. The brine recycling method according to claim 1, wherein said microporous filtration membrane has an average pore size within the range of 0.02 μm to 0.2 μm.

3. The brine recycling method according to claim 1, wherein said microporous filtration membrane comprises a bundled configuration of microporous hollow fibers.

4. The brine recycling method according to claim 1, further comprising a step of passing said agent-added brine, which has been filtrated through said microporous filtration membrane, across an ion exchanger containing an ion-exchange resin to remove said metal ions from said agent-added brine.

* * * * *